United States Patent
Arthur et al.

(10) Patent No.: US 7,866,580 B2
(45) Date of Patent: Jan. 11, 2011

(54) TOWER SUPPORT SYSTEM FOR IRRIGATION SYSTEM

(76) Inventors: Austin Arthur, 904 W. 100 S., Paul, ID (US) 83347; Dalles Duffin, 1105 8th St., Rupert, ID (US) 83350

( * ) Notice: Subject to any disclaimer, the term of this patent is extended or adjusted under 35 U.S.C. 154(b) by 744 days.

(21) Appl. No.: 11/232,377

(22) Filed: Sep. 19, 2005

(65) Prior Publication Data
US 2006/0060665 A1 Mar. 23, 2006

Related U.S. Application Data

(60) Provisional application No. 60/612,964, filed on Sep. 23, 2004.

(51) Int. Cl.
B05B 3/00 (2006.01)
B05B 3/18 (2006.01)
B60K 17/34 (2006.01)

(52) U.S. Cl. .................. 239/728; 239/730; 239/723; 239/735; 180/233; 180/235

(58) Field of Classification Search ......... 239/722–749; 180/233–251
See application file for complete search history.

(56) References Cited

U.S. PATENT DOCUMENTS

| | | | | |
|---|---|---|---|---|
| 2,935,278 A | * | 5/1960 | Lesley | 244/103 R |
| 3,359,039 A | * | 12/1967 | Theissen et al. | 301/39.1 |
| 3,583,639 A | * | 6/1971 | Cornelius | 239/745 |
| 3,851,659 A | * | 12/1974 | Zimmerer et al. | 239/730 |
| 4,093,036 A | * | 6/1978 | Knutson | 180/337 |
| 4,361,788 A | * | 11/1982 | Melocik | 318/83 |
| 4,703,895 A | * | 11/1987 | Harvey | 239/731 |
| 4,795,099 A | * | 1/1989 | Wolfbauer et al. | 239/733 |
| 6,039,273 A | * | 3/2000 | Christensen | 239/729 |
| 7,311,275 B2 | * | 12/2007 | Korus | 239/735 |
| 2002/0179343 A1 | * | 12/2002 | Theilen | 180/9.21 |
| 2004/0195408 A1 | * | 10/2004 | Starr | 239/728 |

* cited by examiner

Primary Examiner—Len Tran
Assistant Examiner—Justin Jonaitis
(74) Attorney, Agent, or Firm—James Cueva

(57) ABSTRACT

A swing arm support system for automated irrigation systems has a support hub and a means to attach and operate two wheels to opposite sides of the support hub. The support hub provides greater ground flotation to prevent the forming of ruts in a field and traction to prevent an automated swing arm from becoming stuck. The swing arm support system provides for the use of common automated irrigation components so that fabrication, repair and operation are most efficient. The support hub in pivotally attached to an existing swing arm support tower. The support hub is carried by two pneumatic tires in one embodiment, four tires in another embodiment, six tires in another embodiment, and movable tracks in another embodiment.

6 Claims, 8 Drawing Sheets

TOWER SUPPORT SYSTEM FOR IRRIGATION SYSTEM

This application claims priority to U.S. provisional application 60/612,964 filed Sep. 23, 2004.

FIELD OF TECHNOLOGY

This description relates to irrigation systems. In particular, this description relates to novel support systems for swing arm support towers for automated irrigation systems.

BACKGROUND

Historically, farmers in all areas of the world have used irrigation to increase the number and types of crops that can be grown. Irrigation has allowed arid, unproductive land to be turned into fertile farm land. Flood irrigation was the original type of irrigation. To irrigate by flood, a river or stream was diverted from its natural bed and into the farm ground. More recently farmers have become conscious of the cost and scarcity of water. Because of water scarcity sprinkler irrigation has become a popular type of irrigation.

In early sprinkler irrigation systems the individual pipes had to be moved manually. Now, because of labor costs and other difficulties associated with moving pipes, automated irrigation is rapidly becoming the favored form of sprinkler irrigation.

One widely used automated irrigation system is commonly known as a "pivot" or "pivot sprinkler system." A pivot sprinkler system has a main arm extending outward from a center pivot structure. The main arm generally comprises a series of pipe sections, that transport water. The pipe sections hold sprinkler heads configured to deliver the water to the field. Each pipe section of the main arm is supported by a tower. The towers are generally supported by two powered wheels. As these wheels turn, the main arm rotates about a central pivot structure. Water is supplied to a fixed inner end of a pipe section and distributed to the sprinklers placed along the pipeline. As the main pipeline section moves about its central pivot structure it irrigates a circular portion of the field.

These automated irrigation systems move in a circular pattern, and because of this, the corners of square fields are not watered by the irrigation system.

To address this short coming, automated irrigation systems have been recently fitted with a steerable swing arm. The irrigation systems are guided by a computerized system that can determine the location of the irrigation system in the field. When the computer determines that the main pipe section of the automated irrigation system is approaching a corner, the steerable swing arm swings out into the corner of the field and irrigates the corner. This guidance is assisted typically by guidewires or markers buried in field that inform the computer of the position of the pivot system in the field.

While this swing arm is effective for watering in square corners, the swing arm is ineffective in many aspects. These swing arms have a corner tower that is supported by two shafts each riding on a single wheel. This configuration places considerable pressure on the wheel, which usually results in deep ruts in muddy, irrigated fields. As the pivot irrigation system moves over the field during a growing season, these ruts may grow deeper and deeper. As the ruts grow deeper the wheels are more prone to becoming stuck. Others have attempted to remedy this problem by using a larger wheel so that the ground pressure from the tower is lightened, but tires for these large wheels are scarce and therefore installation and replacement are expensive. Moreover, the width of a single tire is of little importance if that single tire has become stuck.

When the wheels of the swing arm become stuck, the rest of the irrigation system, nonetheless, may continue across the field causing the irrigation system to bend, break, or tip over. Even if the stuck wheel is discovered, or the pivot system shut of, before the system is damaged, it can be difficult to remove a pivot wheel that has become stuck. Such removal often requires many man-hours and heavy or specialized equipment. This equipment moreover can crush or damage crops or the irrigation system. Frequently, it is necessary to allow the field to dry before attempting to remove a stuck wheel. During certain times of the year crops are very susceptible to drought and may be damaged while allowing the field to dry sufficiently. This damage may result in a reduced, or non-existent crop yield.

An additional problem with current systems is that considerable force and torque can be applied to the support wheel of the swing arm by the weight of the water pipes. This torque can cause the axle or drive shaft that supports the wheel to bend or break. Such damage to the swing arm will be costly to repair and may result in significant down time.

Accordingly, it would be an advantage to provide a swing arm support system that would minimize the depth of ruts formed in a field. It would be an additional advantage if the support system was less susceptible to bending or breakage. It would be an additional advantage to provide a solution that could be retrofitted to current corner swing arm support towers. It would be an additional advantage to use commonly produced parts that could be used interchangeably with other parts commonly used in irrigation systems.

SUMMARY

The present technology provides a support system for a swing arm of an automated irrigation system. In one general aspect, a swing arm support system may include an upper sleeve section and a joint flange that is pivotally connected to the support tower of the swing arm. The upper sleeve section and joint flange can be connected to a hub to which two or more drive wheels are attached. The two or more drive wheels can be configured so that each has a means for driving the wheels. The means for driving the wheels may include a motor and a gear box.

In another general aspect, a swing arm support system may include a single integrated sleeve and hub that is pivotally connected to the support swing arm. Two or more drive wheels are attached to the integrated sleeve and hub. The two or more drive wheels can be configured so that each has a means for driving the wheels. The means for driving the wheels may include a motor and a gearbox configuration, such as a sprocket and a chain.

In another general aspect, a swing arm support system may include an upper sleeve section and a joint flange that is pivotally connected to the support tower of the swing arm. The upper sleeve section and joint flange can be connected to a hub to which two or more drive wheels are attached. The two or more drive wheels can be configured to have a driving means. The means for driving the wheels may include a motor and a single gear box, such as a differential or double shafted gearbox.

In another general aspect, a swing arm support system may include an upper sleeve section and a joint flange that is pivotally connected to the support tower of the swing arm. The upper sleeve section and joint flange can be connected to a hub to which two or more drive wheels are attached. The two or more drive wheels can be configured to have a driving means. The means for driving the wheels may include a single axle passing through the hub. The axle may be turned by a motor and have a gearbox configuration such as a sprocket and chain.

BRIEF DESCRIPTION OF THE DRAWINGS

A more particular description of the technology briefly described above will be rendered by reference to specific embodiments thereof which are illustrated in the appended drawings. These drawings depict only typical embodiments of the technology and are not therefore to be considered to be limiting of its scope. The present technology will be described and explained with additional specificity and detail through the use of the accompanying drawings.

DETAILED DESCRIPTION OF PREFERRED EMBODIMENTS

The presently preferred embodiments of the invention will be best understood by reference to the drawings, wherein like parts are designated by like numerals throughout. It will be readily understood that the components of the system, as generally described and illustrated in the figures herein, could be arranged and designed in a wide variety of different configurations without departing from the spirit of the claims. Thus, the following more detailed description of the embodiments of the apparatus, system, and method of practicing the disclosed technology, as represented in FIGS. 1-8, is not intended to limit the scope of the claims, but is merely representative of the presently preferred embodiments.

Figure 1:
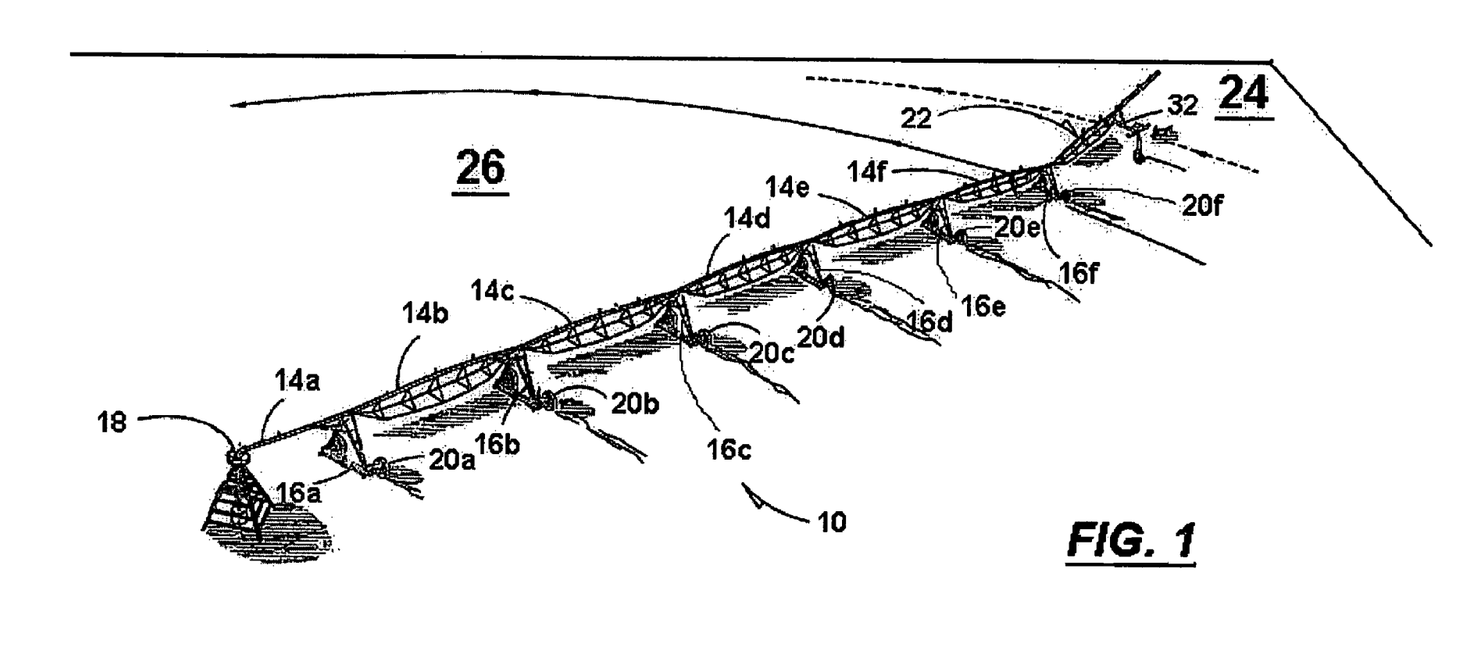
FIG. 1 illustrates a schematic view of an automated irrigation system.
Figure 2:
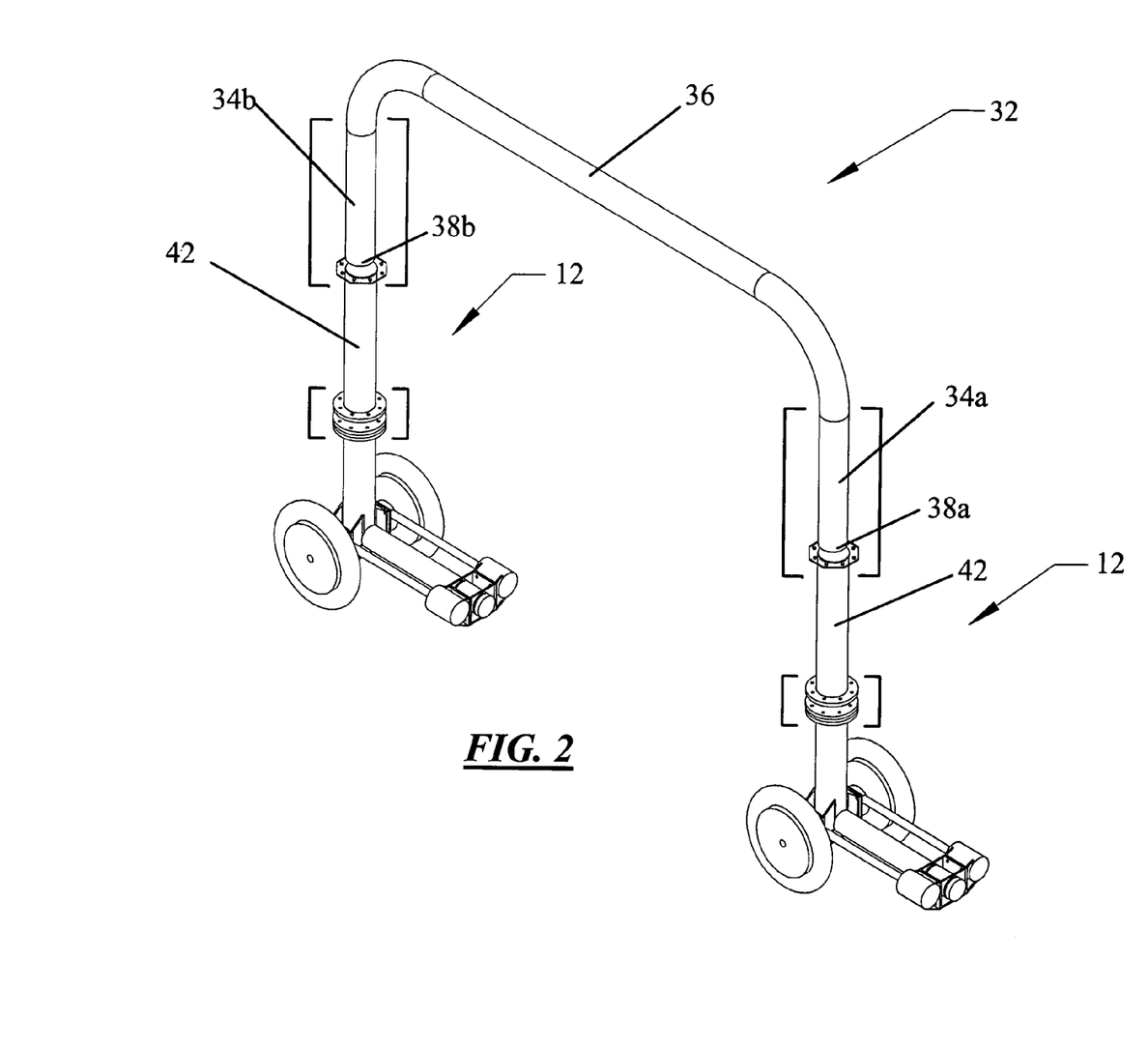
FIG. 2 illustrates a schematic view of a swing arm support tower and swing arm support system in accordance with the present technology.
Figure 3:
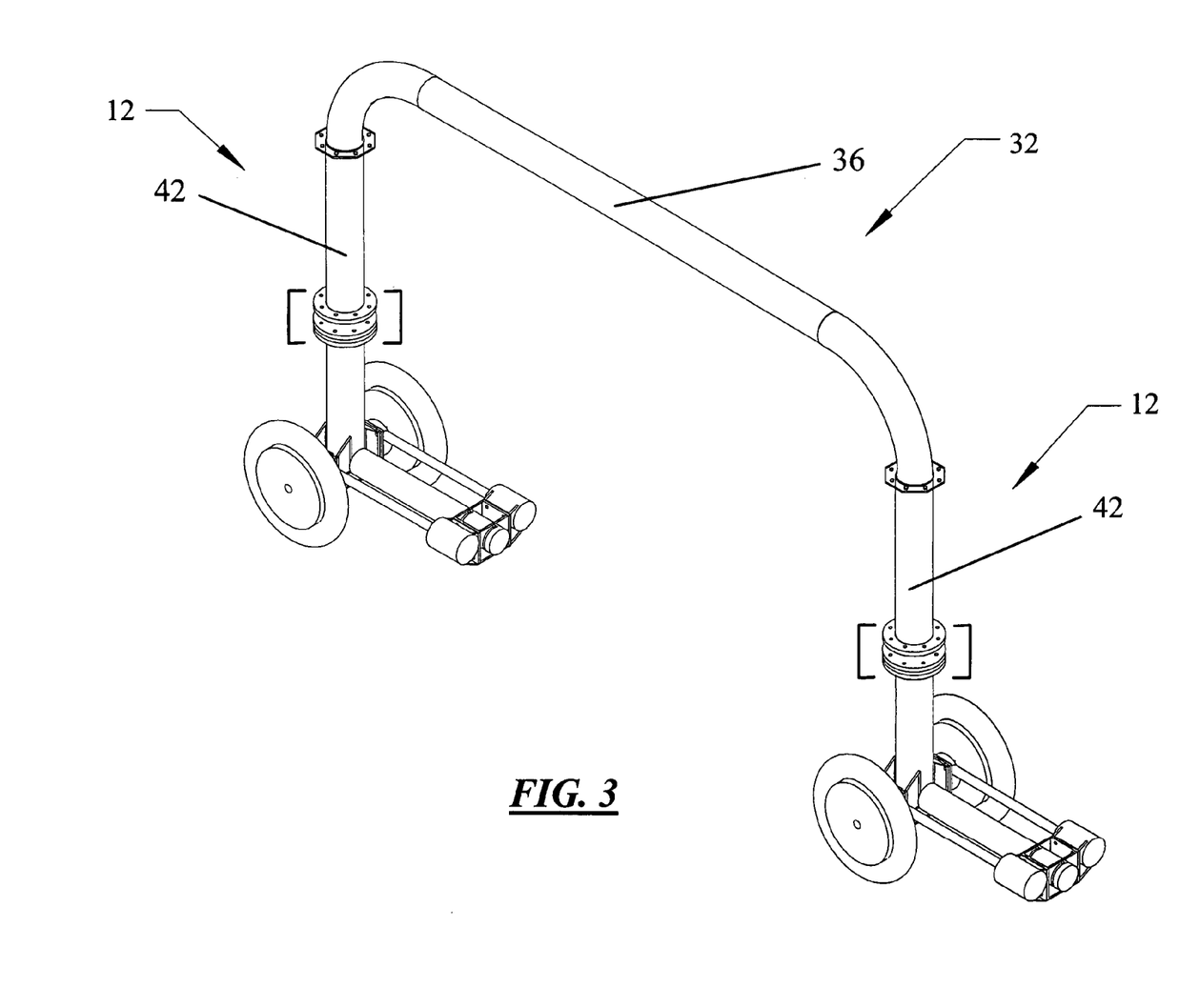
FIG. 3 illustrates a schematic view of a swing arm support tower and swing arm support system in accordance with the present technology.
Figure 4:
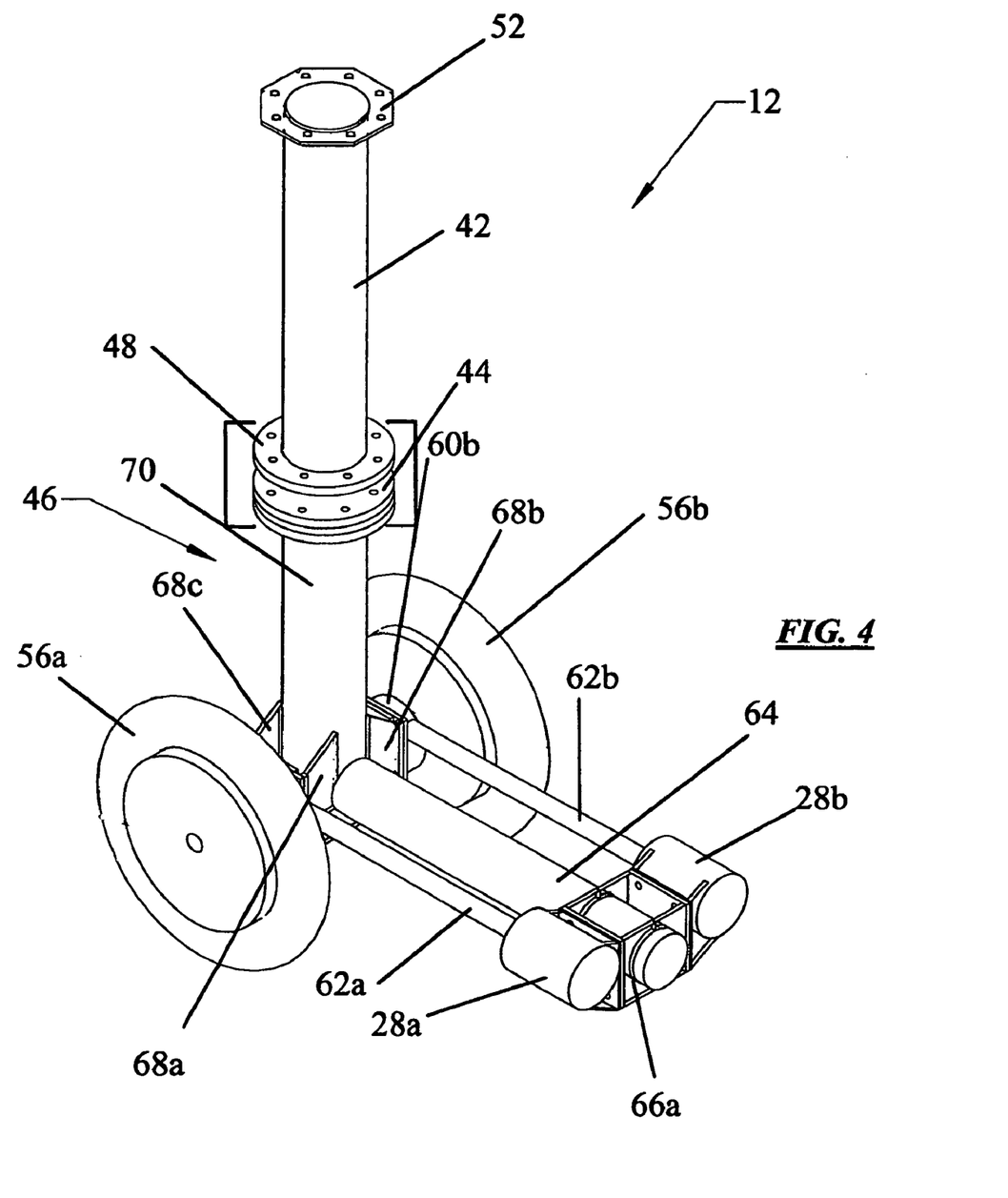
FIG. 4 illustrates a schematic view of a swing arm support system in accordance with the present technology.
Figure 5:
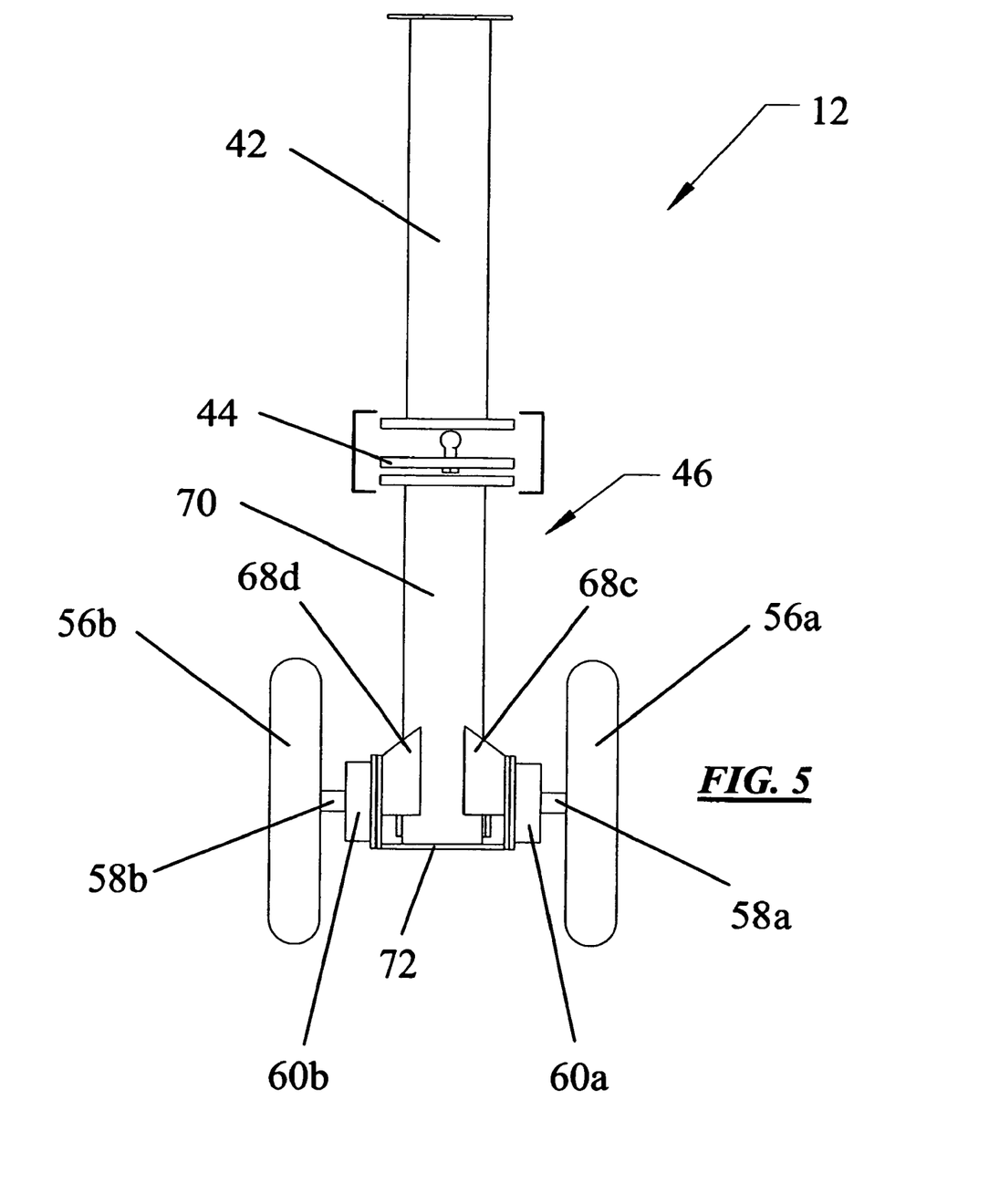
FIG. 5 illustrates a schematic rear view of a swing arm support system in accordance with the present technology.
Figure 6:
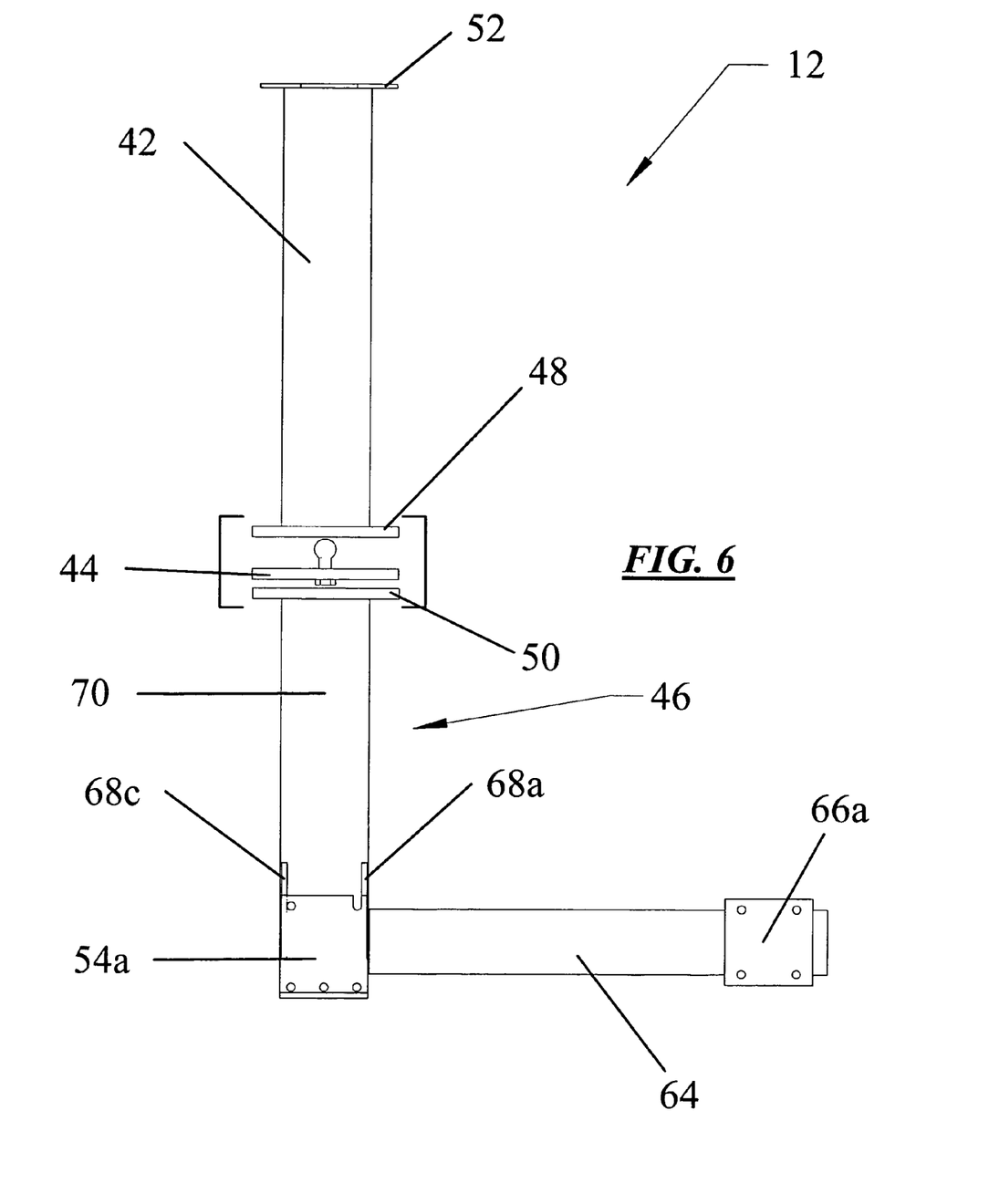
FIG. 6 illustrates a schematic side view of a swing arm support system in accordance with the present technology (shown without wheels, gearboxes, shafts, drivelines, or motors).
Figure 7:
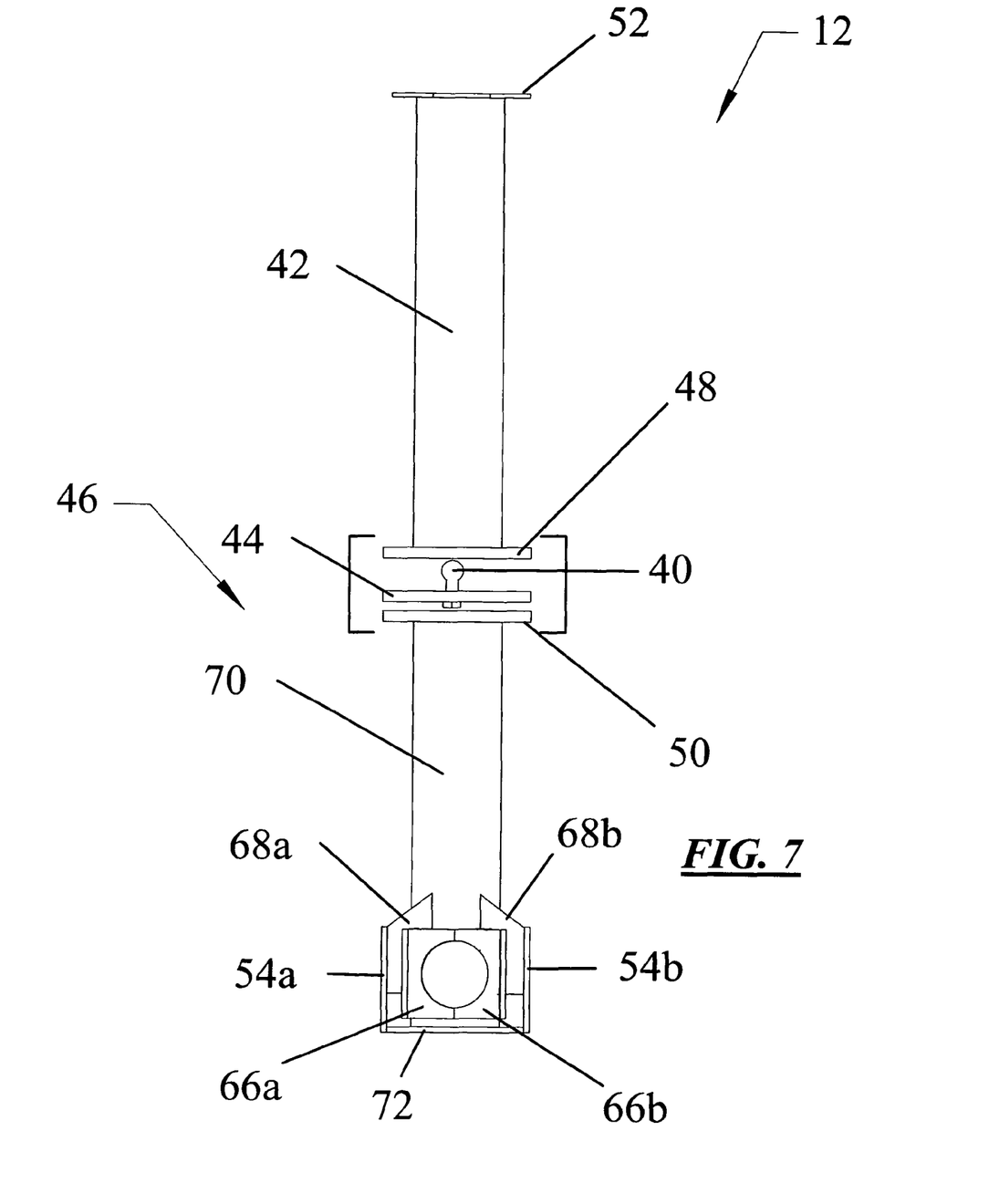
FIG. 7 illustrates a schematic front view of a swing arm support system in accordance with the present technology (shown without wheels, gearboxes, shafts, drivelines, or motors).
Figure 8:
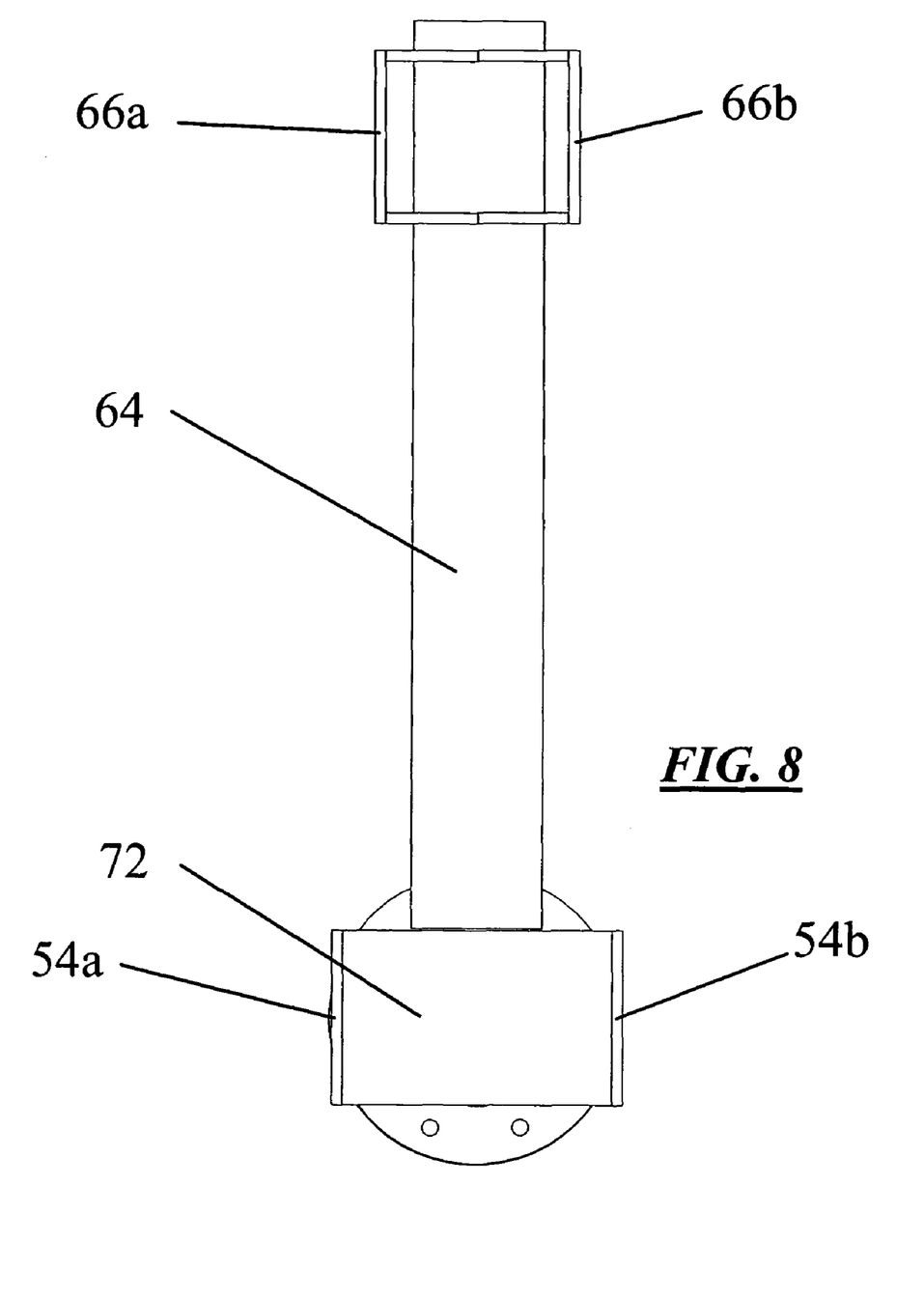
FIG. 8 illustrates a schematic bottom view of a swing arm support system in accordance with the present technology (shown without wheels, gearboxes, shafts, drivelines, or motors).

Referring to FIGS. 1-8, a center pivot irrigation system 10 is presented. FIG. 1 shows a schematic view of a pivot irrigation system 10. The pivot irrigation system 10 includes a tower support system 12. The irrigation system 10 comprises a plurality of pipe sections 14a-14f that are supported by a plurality of towers 16a-16f. Pipes 14a-14f and towers 16a-16f of irrigation system 10 are generally configured to rotate about a pivot point 18. Water is supplied to irrigation system 10 at pivot point 18 through the use of underground pipes (not shown).

Each tower 16a-16f has a set of drive wheels 20a-20f that are configured to rotate forward and backward. Drive wheels 20a-20f are not configured to turn right or left. As drive wheels 20a-20f rotate, irrigation system 10 travels in a circular pattern about pivot point 18. Irrigation system 10 includes a swing arm 22 that includes one or more sections of pipes to move out into a corner 24 of a field 26. Thus, corner 24 can be watered by swing arm 22.

With continued reference to FIG. 1, irrigation system 10 is preferably controlled by an automated guidance system (not shown) that is configured to calculate when irrigation system 10 reaches corner 24 of field 26. The automated guidance system computer (not shown) then activates a steering mechanism (not shown) on swing arm 22, and swing arm 22 drives into corner 24. Such automated guidance systems are known in the art and generally comprise a computer (not shown) and guidance lines (not shown) or guidance points (not shown) buried in field 26. The guidance lines are used by the computer to determine the position of irrigation system 10 in field 26.

Turning now to FIGS. 2-7. In one preferred embodiment tower support system 12 supports swing arm tower 32. Tower 32 has two insert members 34a, 34b extending downward and perpendicular from a horizontal member 36 of tower 32. The bottoms 38a, 38b of insert members 34a, 34b contains a ball coupler (not shown) to receive a tow ball 40. An upper connection sleeve 42, a jointing flange 44, and a support hub 46 are connected together to form support system 30. Upper connection sleeve 42 has a lower flange 48. Support hub 46 may have a support hub flange 50. One preferred method of connecting upper connection sleeve 42 to support hub 46 is by bolting together lower flange 48, jointing flange 44 and support hub flange 50. Another preferred method of connecting upper connection sleeve 42 to support hub 46 is by welding together lower flange 48, jointing flange 44 and support hub flange 50.

In some implementations support system 30 may be pivotally attached to tower 32 by placing insert members 34a, 34b into upper connection sleeve 42 and connecting the ball coupler to tow ball 40. This allows swing arm support system 30 to rotate about insert members 34a, 34b. An upper flange 52 of upper connection sleeve 42 is attached to the existing steering mechanism (not shown) of swing arm 22. The swing arm support system 30 is steered into corner 24 of field 26 by the steering mechanism of irrigation system 10 and drive swing arm 22. In another embodiment, support system 30 may also be attached through the use of ball bearings attached between insert members 34a, 34b and upper connection sleeve 42.

Particular implementations may include making upper connection sleeve 42 of swing arm support system 30 from tubular shaft material. Such a shaft is typically constructed of a section of tubular metal such as steel or aluminum. Galvanized steel being the most preferred material. Jointing flange 44, lower flange 48, support hub flange 50, and upper flange 52 are generally made from steel plate or other suitable material. Preferred steel plate thicknesses generally range from about 0.25 inches to 1.5 inches, although these thicknesses may increase or decrease depending upon the particular material properties.

In certain implementations, support hub 46 presents gearbox plates 54a, 54b for two drive wheels 56a, 56b. Drive wheels 56a, 56b can be configured to rotate in a forward and a backward direction. While drive wheels 56a, 56b are shown in a single wheel configuration having 2 wheels total, it is of another preferred embodiment that the wheels be configured as dual wheels (4 wheels total), triple wheels (6 wheels total) or even more wheels per side as the end user prefers or requires. Additional wheels result in increased surface contact, which reduces pressure on the ground and the crops. Another embodiment allows for the use of wider wheels to further increase the surface contact of the wheel. An additional embodiment allows for the wheels to be removed and a movable track to be used as the ground floatation means. Movable tracks are a common means of ground floatation for tanks, tractors, and other machines that require a large surface contact area.

Embodiments having at least two drive wheels 56a, 56b provide a number of advantages. Two drive wheels 56a, 56b disperse the weight of water-filled swing arm 22 over a larger area, which increases the flotation of the swing arm 22, thereby reducing the depth of ruts. Shallower ruts accordingly lessen the likelihood that irrigation system 10 will become stuck in field 26.

Current systems are generally supported by a hub that is configured to create a single attachment point for a drive wheel. Because of this configuration, the hub maybe weakened by the considerable torque that is applied to the axle or shaft of the wheel. This torque may damage or break the shaft. The double wheel configuration of the present support system provides a more uniform distribution of weight on both wheels 56a, 56b with little or no torque being applied to shafts 58a, 58b.

Two drive wheels 56a, 56b also provide additional traction and power. If swing arm 22 encounters a deep rut or a muddy area in field 26, loss of traction by a single wheel will be countered by the second wheel, thereby preventing the entire irrigation system 10 from becoming stuck in the rut or mud.

In one preferred embodiment wheels 56a, 56b can be operablely connected to support hub 46 by a shaft 58a, 58b. One embodiment for wheels 56a, 56b is the use of standard automated irrigation wheels (see 20a-20f). Shafts 58a, 58b may be operablely connected to gearboxes 60a, 60b that are powered by operablely connected motors 28a, 28b. One preferred means of connecting the gearboxes 60a, 60b to the motors 28a, 28b is with drivelines 62a, 62b. Gearboxes 60a, 60b may be selected from standard automated irrigation gearboxes of known systems. Known gearboxes are commonly used by automated irrigation manufactures such as Valley® and Reinke® to connect and drive wheels 20a-20f.

Motors 28a, 28b can be center-drive motors and can be mounted on a lower connection unit 64. Lower connection unit 64 has two motor mounts 66a, 66b and is connected to support hub 46. Lower connection unit 64 and motor mounts 66a, 66b may be generally constructed of steel, aluminum or other suitable material. Galvanized steel being the most preferred. Alternatively, motor mounts 66a, 66b can be created as an integral part of lower connection unit 64. For example, lower connection unit 64 may be box steel, which would provide flat surfaces for mounting motors 28a, 28b. Alternatively, lower connection unit 64 may be custom fabricated in any manner known to those in metal or material fabrication to present a connection unit having the ability to support a motor or motors. Motor mounts 66a, 66b support two independent motors 28a, 28b that supply power to gearboxes 60a, 60b through drivelines 62a, 62b. One preferred type of motor for motors 28a, 28b is a one-half horsepower electric center-drive motor.

Another preferred embodiment of mounting the motors allows for the use of an angle drive motor. In this preferred embodiment, lower connection unit 64 is removed and angle drive motors are mounted directly, and on opposing sides, to support hub 46 and operably connected to a known corner gearbox. The corner gearbox can then be operably connected to wheels 56a, 56b. This allows for a more compact configuration, but known angle drive motors generally require more power to operate than known corner gearboxes.

Another preferred embodiment uses a dual-output gearbox, commonly known as a differential, in place of gearboxes 60a, 60b. The dual-output gearbox may be operably connected to support hub 46. A single motor may be attached to either support hub 46 or the lower connection unit 64 and operably connected to the dual-output gearbox via a driveline. Drive wheels 56a, 56b are operably connected to the dual-output gearbox.

Another preferred embodiment uses a single axle passing through the support hub 46 with drive wheels 56a, 56b attached to opposing ends of the axle. The axle has an attached gearbox means for rotating the axle, such as a gear sprocket. A motor may have a drive sprocket to allow the motor to be operably attached to the support hub 46. The gear sprocket and the drive sprocket can be operably attached using a means such as a chain.

If wheels 56a, 56b become flattened or require replacement, support hub 46 may be jacked-up and wheels 56a, 56b may be replaced. This creates an advantage over known systems, where for a single wheel to be repaired, the entire support tower requires lifting by heavy equipment.

Support hub 46 may be constructed and arranged in any manner that allows for the attachment and operation of at least two wheels on opposing sides of the support hub. Referring to FIGS. 4-8, one embodiment of support hub 46 may be comprised of braces 68a-68d secured to a lower member 70. Braces 68a-68d can be attached to lower member 70 through a number of means known in the art such as welding, or bolting, or may be manufactured as a integral part of support hub 46. For small scale production, the preferred means is welding. Gearbox plates 54a, 54b are connected to the braces 68a-68d on the right lateral and left lateral of the lower member 70. A bottom plate 72 is attached to the bottom of the lower member 70 to provide support to gearbox plates 54a, 54b.

Particular implementations may include lower member 70 of support hub 46 generally being made of a tubular shaft. Such a shaft is typically constructed of a section of tubular metal such as steel or aluminum. Galvanized steel being the most preferred material. Braces 68a-68, gearbox plates 54a, 54b, and bottom plate 72 may be generally made from steel plate or other suitable material. Galvanized steel being the most preferred. Preferred steel plate thicknesses generally range from about 0.25 inches to 1.5 inches, although these thicknesses may increase or decrease depending upon the particular material properties. It is well known by those individuals familiar with metal fabrication that galvanized steel is not easily welded. Therefore, the construction of embodiments is generally known to be first constructed using a common, weld-friendly steel and subsequently galvanized.

In the illustrated embodiments, tower 32 is a standard commercially available tower. Other designs of commercially available towers exist and swing arm support system 30 can be retrofitted to fit such commercially available towers. It is also anticipated that support system 30 can be configured or modified to be readily attached to other support systems.

We claim:

1. A steerable support apparatus for supporting and steering an irrigation swing arm, the apparatus comprising:
   a support member extending transversely to an irrigation swing arm;
   a first support hub operatively connected to said support member;
   a second support hub operatively connected to said support member;

a first gearbox operatively connected to said first support hub;

a second gearbox operatively connected to said second support hub;

a first and a second ground floatation member operatively connected to said first gearbox, wherein said first and said second ground floatation members are positioned on opposing sides of said first support hub, and wherein said first ground flotation member is positioned for movement along a different path of travel from that of said second ground floatation member; and a third and a fourth ground floatation member operatively connected to said second gearbox, wherein said third and fourth ground floatation members are positioned on opposing sides of said second support hub, and wherein said third ground flotation member is positioned for movement along a different path of travel from that of said fourth ground floatation member.

2. A steerable irrigation swing arm support apparatus comprising:

a horizontal member of an irrigation support tower;

a first support hub operatively connected to said horizontal member;

a second support hub operatively connected to said horizontal member;

a first gearbox operatively connected to said first support hub;

a second gearbox operatively connected to said first support hub;

a third gearbox operatively connected to said second support hub;

a fourth gearbox operatively connected to said second support hub;

a first ground floatation member operatively connected to said first gear box and a second ground floatation member operatively connected to said second gearbox, wherein said first and said second ground floatation members are positioned on opposing sides of said first support hub, and wherein said first ground flotation member is positioned for movement along a different path of travel from that of said second ground floatation member; and a third ground floatation member operatively connected to said third gear box and a fourth ground floatation member operatively connected to said fourth gearbox, wherein said third and said fourth ground floatation members are positioned on opposing sides of said second support hub, and wherein said third ground flotation member is positioned for movement along a different path of travel from that of said fourth ground floatation member.

3. The apparatus of claim 1 wherein said ground floatation members are wheels.

4. The apparatus of claim 1 further comprising a first motor operatively connected to the first gearbox and a second motor operatively connected to the second gearbox.

5. The apparatus of claim 2 wherein said ground floatation members are wheels.

6. The apparatus of claim 2 further comprising a first motor operatively connected to the first gearbox, a second motor operatively connected to the second gearbox, a third motor operatively connected to the third gearbox, and a fourth motor operatively connected to the fourth gearbox.

* * * * *